United States Patent [19]

Benson, Jr.

[11] 4,138,006
[45] Feb. 6, 1979

[54] POWER TRANSMISSION OF THE INTERLEAVED, MULTIPLE FRICTION PLATE CLUTCH TYPE

[75] Inventor: Carl I. Benson, Jr., Taunton, Mass.

[73] Assignee: Paragon Gears Incorporated, Taunton, Mass.

[21] Appl. No.: 846,725

[22] Filed: Oct. 31, 1977

[51] Int. Cl.² .................. F16D 21/04; F16D 21/06; F16D 13/42
[52] U.S. Cl. ..................... 192/48.91; 74/361; 74/377; 192/21; 192/54; 192/70.23
[58] Field of Search ............... 192/21, 48.91, 51, 54, 192/70.23; 74/361, 377

[56] References Cited

U.S. PATENT DOCUMENTS

| 870,202 | 11/1907 | Sponsel | 74/361 |
|---|---|---|---|
| 1,778,970 | 10/1930 | Cotta et al. | 74/377 |
| 3,703,226 | 11/1972 | Strehler | 192/70.23 X |
| 3,977,503 | 8/1976 | Hurst | 192/54 X |
| 4,022,308 | 5/1977 | Hurst | 192/54 X |
| 4,051,934 | 10/1977 | Hurst | 192/21 |

FOREIGN PATENT DOCUMENTS 256061 12/1927 Italy ............................... 192/21

Primary Examiner—Allan D. Herrmann
Attorney, Agent, or Firm—James E. Nilles

[57] ABSTRACT

A power transmission of the type having an interleaved, multiple friction plate clutch in which helical cam elements are used to provide clutch plate clamp up force and transmit driving torque between the parts. In one form of such a transmission where the input and output members are arranged in coaxial alignment, special axial thrust absorbing means are used for absorbing the axial thrust developed in one clutch assembly.

9 Claims, 14 Drawing Figures

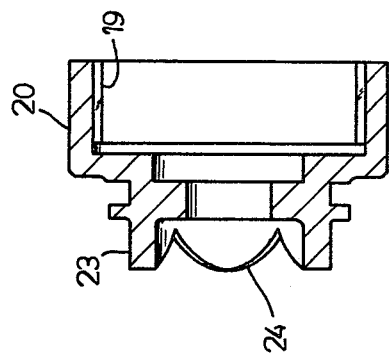
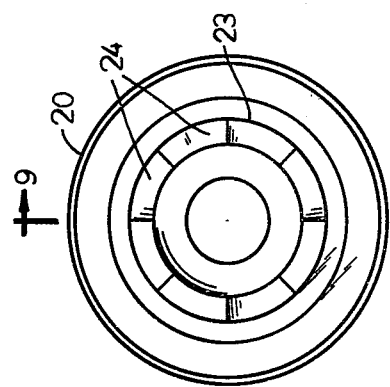
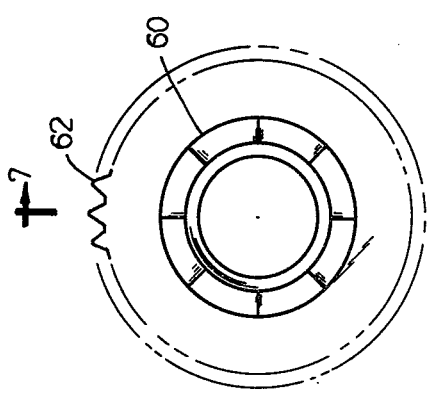
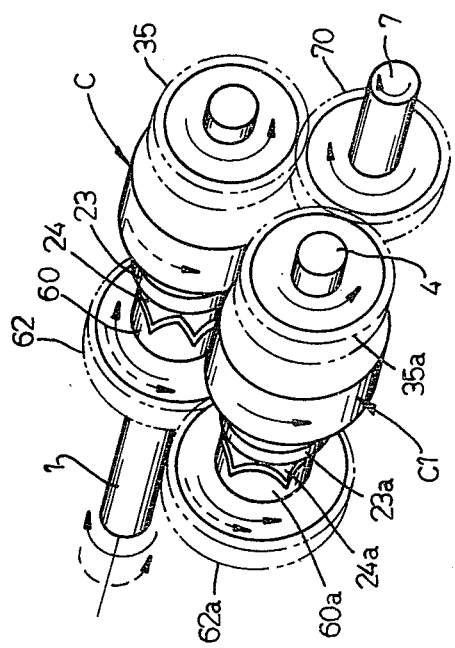
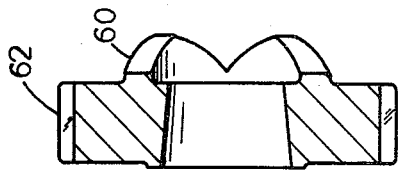

POWER TRANSMISSION OF THE INTERLEAVED, MULTIPLE FRICTION PLATE CLUTCH TYPE

BACKGROUND OF THE INVENTION

The invention pertains to power transmissions, drive couplings, or clutching mechanisms of the type which utilize clutches with helical cam actuators for transmitting power between power transmitting rotatable shafts. Such prior devices have limitations because of their inability to transmit power selectively in opposite directions through the transmission, inability to absorb sufficient energy without deterioration of the type of clutch employed thus preventing shifts at high speeds and loads, requiring close dimensional control in the manufacturing processes of the parts, lack of uniform quality of engagement of the clutches, and furthermore, engagement and disengagement often difficult and variable from one clutch to another. Still other prior art devices were such that spiral splines were used but required both right hand and left hand splines for reversing the direction of rotation of the transmission which resulted in cumbersome and expensive construction, and required different parts for any particular direction of input rotation.

Some examples of prior art devices in general are shown in the U.S. Pat. No. 3,977,503 which issued Aug. 31, 1976 and entitled "Clutch" and in the U.S. Pat. No. 3,135,129 which issued June 2, 1964 and entitled "Reversing Gear."

SUMMARY OF THE PRESENT INVENTION

The present invention provides a power transmission of the interleaved, multiple friction plate clutch type and having helical cam surfaces between one of the power transmitting members, such as an input shaft, and a friction plate clutch clamping device such as a clutch drum having an interiorly splined surface to which some of the clutch plates are attached. Other clutch plates are attached to an external splined extension of an output gear. The arrangement is such that the cams rotate together and never become disengaged but are axially movable with respect to each other and these cams act to develop clutch plate clamp up force and transmit driving torque through the transmission.

A more specific aspect of the invention relates to such a transmission in which the power transmitting shafts, for example, the input and output shafts, are arranged coaxially with respect to each other and wherein the axial thrust of the shafts in either direction are absorbed by a special axial thrust absorbing means; in other words, when the cams are acting to transmit large axial thrusts, as when clamping the friction plate clutch, these thrusts cause certain problems which the present invention overcomes.

Generally, the present invention provides an interleaved multiple friction plate type clutch power transmission which obviates the difficulties found in prior art devices of this character.

These and other objects and advantages of the present invention will appear hereinafter as this disclosure progresses, reference being had to the accompanying drawings.

BRIEF DESCRIPTION OF THE DRAWINGS

FIGS. 1 through 10 are views of a power transmission made in accordance with the present invention, wherein the input and output shafts are arranged in parallelism, but spaced from one another;

FIG. 1 is a longitudinal, cross sectional view through a power transmission made in accordance with the present invention, the view being taken generally along the line 1—1 in FIG. 3;

FIG. 2 is another longitudinal, cross sectional view through the transmission, but generally taken along the line 2—2 in FIG. 3;

FIG. 3 is an end view of the transmission shown in FIGS. 1 and 2 and taken generally along the line 3—3 in FIG. 1;

FIG. 4 is a transverse, cross sectional view taken generally along the line 4—4 in FIG. 1;

FIG. 5 is a perspective, more or less schematic view of the transmission shown in FIGS. 1 to 4, but on a reduced scale;

FIG. 6 is a transverse, elevational view of one of the helical cam elements, the view being taken generally along the line 6—6 in FIG. 10;

FIG. 7 is a cross sectional view through the element shown in FIG. 6, taken generally along the line 7—7 in that figure;

FIG. 8 is a transverse, cross sectional view taken generally along the line 8—8 in FIG. 10;

FIG. 9 is a cross sectional view taken generally along the line 9—9 in FIG. 8;

FIG. 10 is a perspective, exploded view of the helical cam elements shown in FIGS. 1-9, and also including the shifting mechanism therefor;

FIG. 11 is a longitudinal, cross sectional view showing a modified form of the power transmission made in accordance with the present invention;

FIG. 12 is an end view of the transmission shown in FIG. 11, certain parts being shown as broken away or removed for the sake of clarity;

FIG. 13 is a plan view of the transmission shown in FIG. 11, certain parts being shown as broken away or removed for the sake of clarity.

DESCRIPTION OF A PREFERRED EMBODIMENT

FIGS. 1-10 modification

Figure 1:
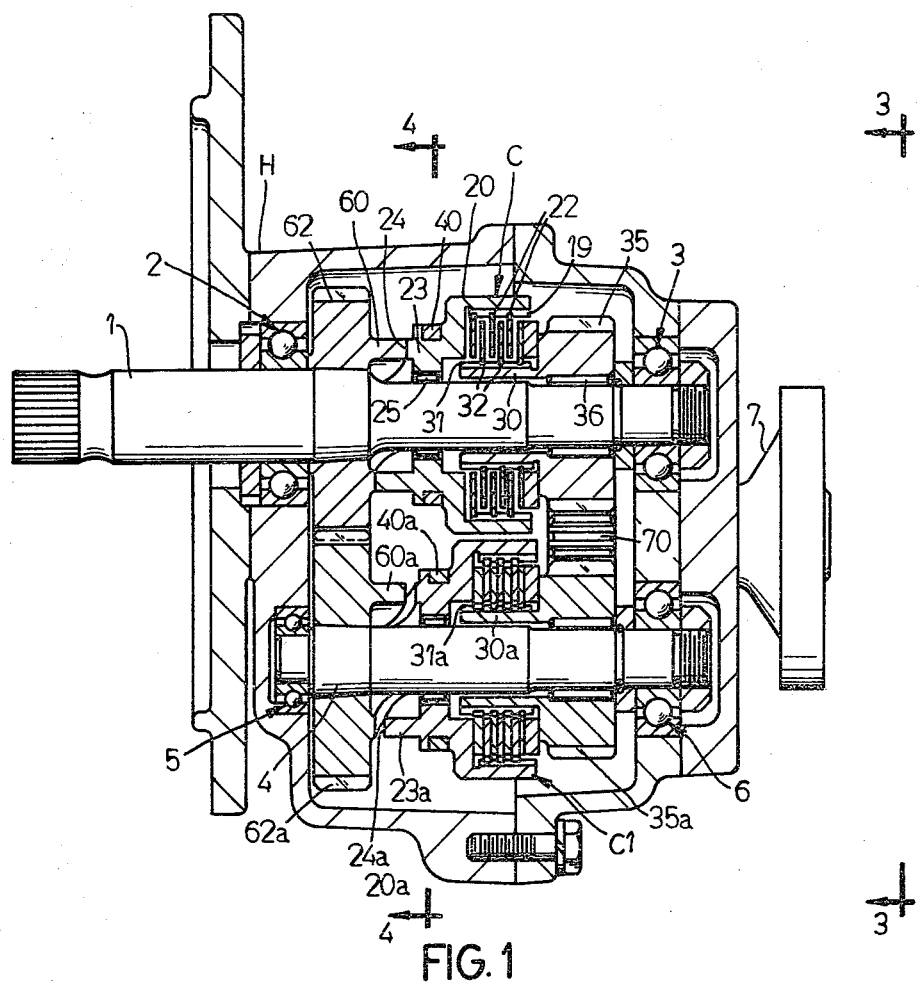
Figure 2:
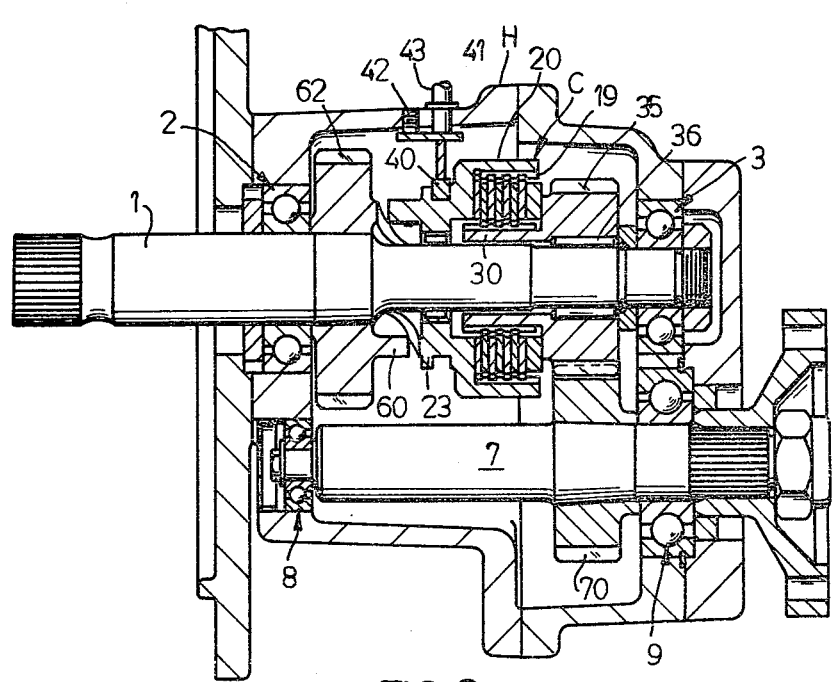
Figure 4:
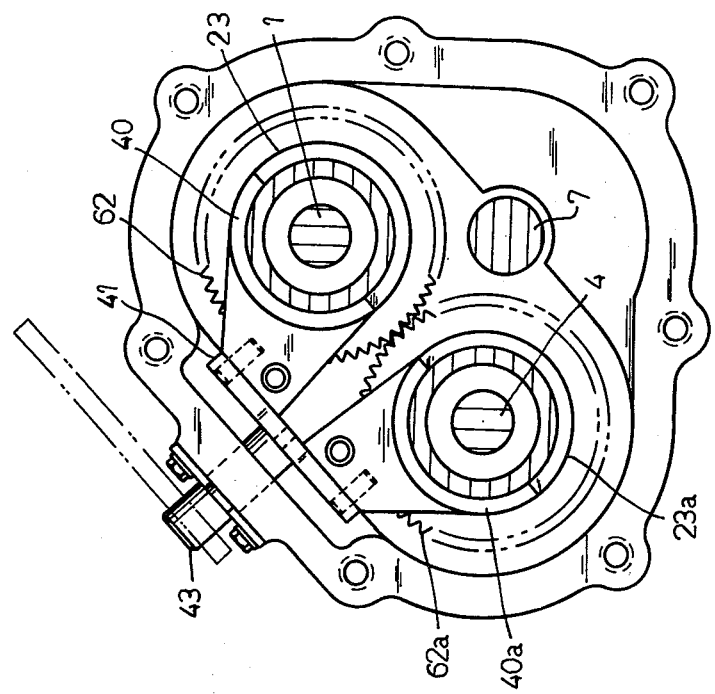
Figure 3:
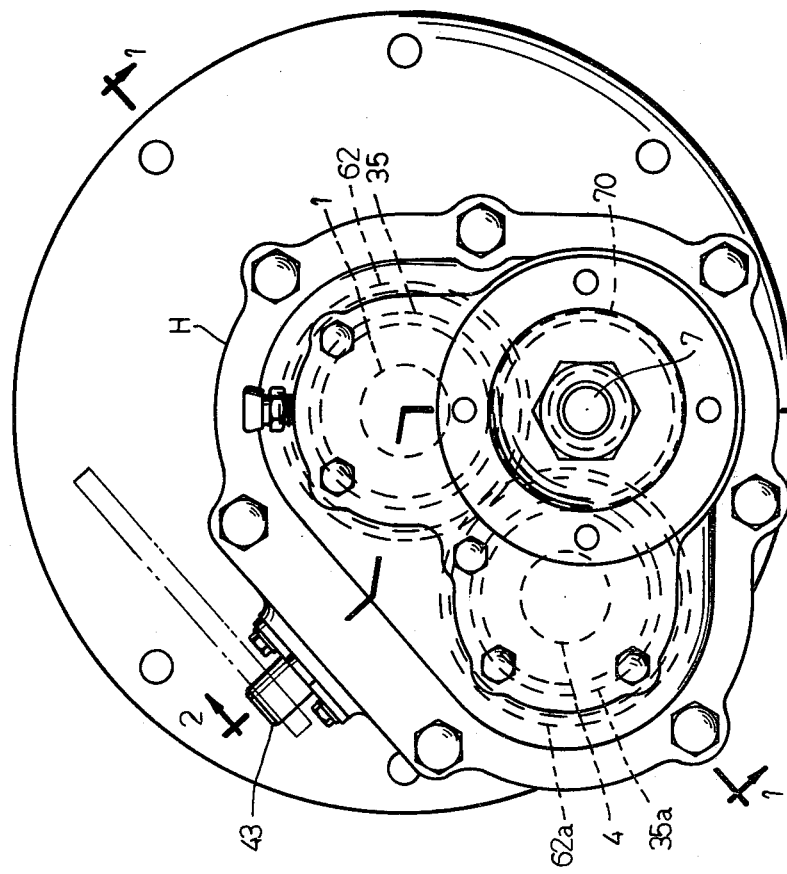

The invention is shown in FIGS. 1 to 10 as embodying the power transmission wherein the power transmitting shafts, such as the input and output shafts are arranged in spaced, parallel disposition in respect to one another. A suitable housing H is provided for mounting a first power transmitting shaft 1 in conventional anti-friction bearing assemblies 2 and 3 within the housing, for mounting a second power transmitting shaft 4 in suitable anti-friction bearing assemblies 5 and 6, and also for rotatably mounting a third power transmitting member in the form of the output shaft 7 in conventional anti-friction bearing assemblies 8 and 9.

Interleaved, multiple friction plate clutches C and C1 are mounted around shafts 1 and 4, respectively, and are similar in construction so that similar parts are correspondingly numbered, except that a suffix "a" has been attached to the parts of clutch C1. It is believed sufficient that a detailed description of only one clutch will be made herein.

The clutch C includes a cam driven clamping device, for example a clutch drum member 20 having axial internal splines 19 around its interior cylindrical surface to which are splined in the known manner the clutch plates 22. The clutch drum member 20 also has an axially extending hub 23 and helical cam elements 24 facing in an axial direction from said axially extending hub 23. An anti-friction bearing assembly 25 rotatably supports the drum member 20 on the shaft 1.

The clutch C also includes a second clutch member 30 having external splines 31 therearound to which are splined the friction plates 32 in the known manner. The second clutch member 30 has a gear 35 formed integrally therewith and which is formed by means of an anti-friction bearing assembly 36 on shaft 1. Thus, the interleaved friction plates 21 and 32 can be clamped together in the known manner to effect a driving connection through the clutch or they can be separated when the drum 20 is shifted to the left as viewed in FIG. 1 so as to disengage the clutch.

Figure 10:
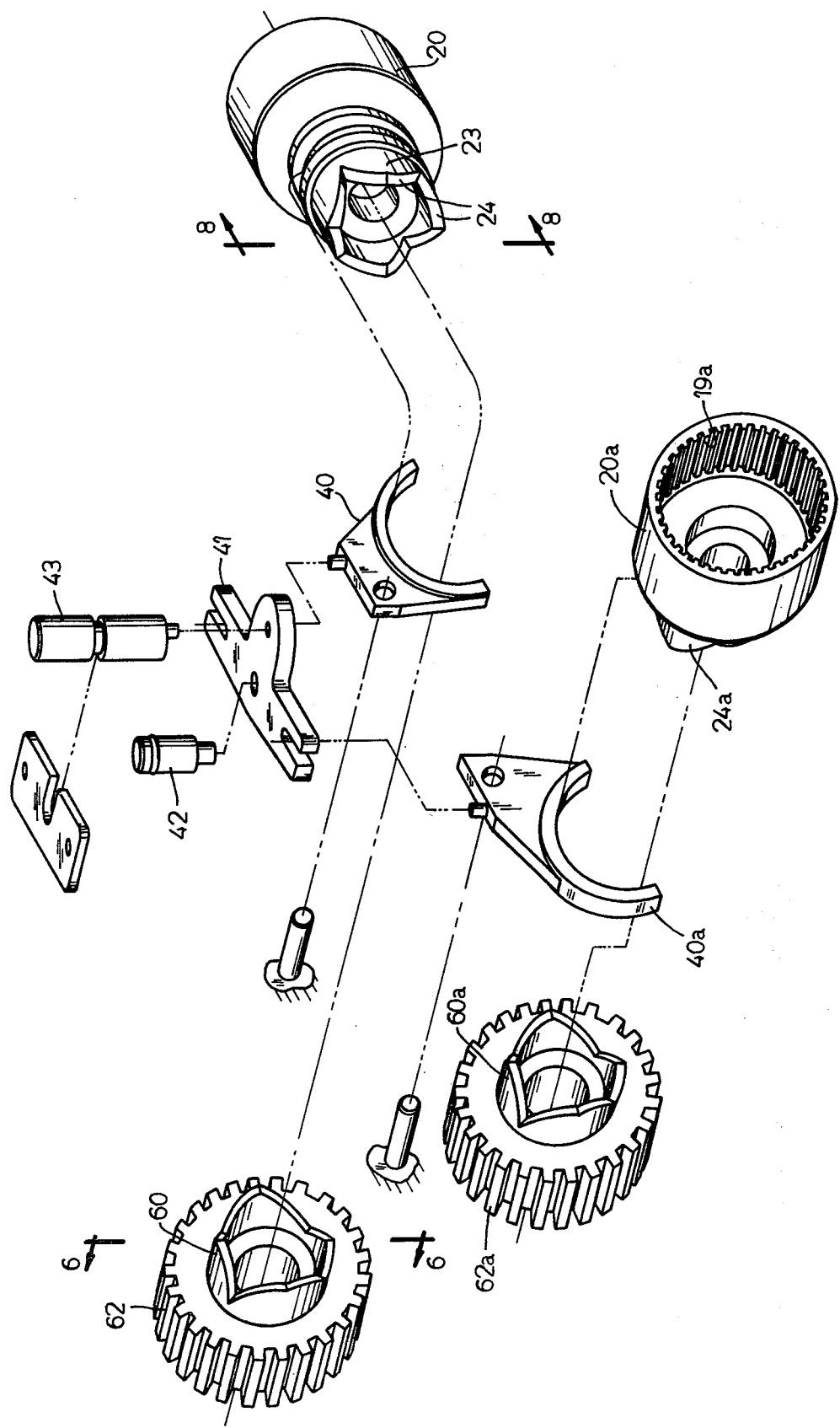

Means are provided as best shown in FIG. 10 for shifting the clutch drum member 20 in an axial direction and this means includes a shifter collar 40, a shifter yoke 41 pivoted in the housing on the pin 42 and actuated by a shifter means 43 in the known manner.

Another helical cam element 60 is fixed with the shaft 1, and in the embodiment shown in FIG. 1, the cam element 60 extends in an axial direction from a gear member 62 that is fixed to shaft 1 for rotation therewith. Thus in effect, the helical cam element is fixed to shaft 1 for positive driving engagement therewith.

A similar arrangement is provided for clutch C1 in the housing and operates in the manner above described. The arrangement for clutch C1 includes gear 62a fixed to shaft 4, a gear 35a rotatably journalled on shaft 4 and including the clutch element 30a. Clutch C1 has a clutch drum member 20a including a helical cam element 23a that engages a corresponding helical cam element 60a that is made integral with gear 62a. The clutch drum 20a is shifted in a manner similar to the manner to shifting of clutch drum 20, and is accomplished by means of the shift collar 40a which is also actuated by the shift yoke 41.

With the above construction, the clutch C and C1 are selectively shifted in axial but opposite directions so that either clutch C or C1 is engaged while the other is disengaged. More specifically, when clutch C1 is clamped up or engaged, power is transmitted from shaft 1 through shaft 35 and to a gear 70 fixed to output shaft 7. On the other hand, when clutch C1 is engaged, power is transmitted from shaft 1 through gear 62, 62a, shaft 4, gear 35a, and to shaft 70 of the output shaft 7. Gears 35 and 35a are in constant mesh with gear 70 of the output shaft.

The transmission shown in FIG. 1 as above described, has one friction plate clutch on each of two shafts and helical cam means are provided between their respective shafts and a clutch element for axially shifting one of the clutch elements in an axial direction to engagingly clamp up and disengage the friction plates of the clutch, thereby clutch clamp up force and driving torque are transmitted through the helical cam elements. It is understood that the cam elements never become disengaged but simply move axially a small distance with respect to one another, both rotating together. The cam elements constitute torque transmitting means for driving the clamping device that takes form in the embodiment shown of the clutch drum member. The cam elements abut one another and are located on the axial ends of their respective members and face in an axial direction.

In respect to the cam elements 23 and 60, it will be noted from FIG. 10 in particular that they have opposite sides so that power can be transmitted on either side of the cam elements for driving in forward and reverse directions.

FIGS. 11-14 Modification

The power transmission shown in FIGS. 11 to 14 is of the type in which the input and output shafts are arranged in coaxial alignment with one another, there being two interleaved, multiple friction plates clutches C3, C4, mounted around one of the shafts and both clutches being operated by cam means located on the shaft. The arrangement is such that either one clutch or the other is engaged while the other is disengaged thereby transmitting power in forward or reverse directions as will appear. It should furthermore be understood that this arrangement provides for bi-directional flow of power for transmitting that is either shaft can be used as the input shaft while the other constitutes the output shaft.

Referring in greater detail to FIGS. 11 to 14, a power transmitting shaft 100 is rotatably journalled in anti-friction bearing assembly 101 in the housing 102. Another shaft 104 is journalled in an anti-friction bearing assembly 105 in the housing 102. Shaft 100 is in coaxial arrangement with shaft 104 and an anti-friction bearing assembly 107 mounted in a bore 103 in the end of shaft 104 rotatably pilots the end of shaft 100 in shaft 104. More specifically, that shaft 104 has a cavity or counterbore 110 formed in one end and the threaded end of shaft 100 extends into this cavity and has a large nut 112 threadably engaged thereon. A thrust washer 113 is located between the nut and an anti-friction bearing assembly 114 which abuts against shoulder 115 formed by the counterbore 110 on the end of the shaft 104.

Shaft 104 is generally tubular in form and has an axially and inwardly extending portion that extends into the housing and terminates in a clutch element 118. The clutch element 118 has external splines 119 around its periphery to which are splined in the conventional manner, to clutch plates 120. An anti-friction needle bearing assembly 121 rotatably supports the clutch element on the shaft 100. The interleaved, multiple friction plate clutch C3 is located around shaft 100 and includes the aforementioned clutch element 118 and also a clutch element in the form of a clutch drum member 124 that has interior splines 125 on which are splined the friction plates 126 which are interleaved with plates 120 in the known manner. The clutch drum member 124 has axially facing helical cam elements 130 around its inner end.

Figure 12:
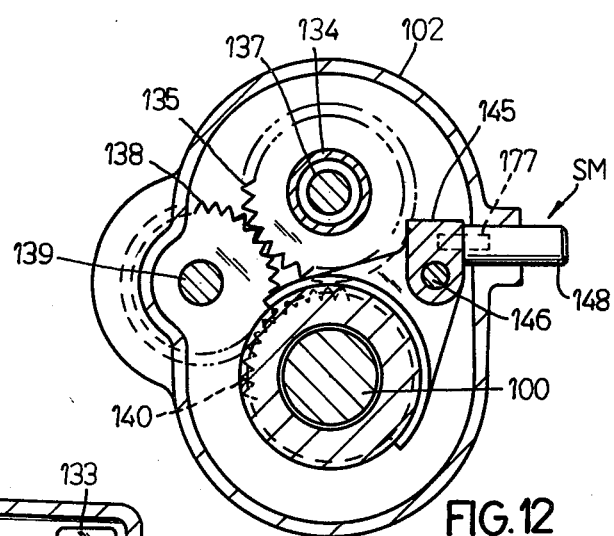

A similar clutch C4 is also mounted around shaft 100 and axially spaced from clutch C3. Parts of clutch C4 which are similar to clutch C3 have been correspondingly numbered with the addition of a suffix "a" at their operation is also similar. However, it will be noted that the clutch element 118a is fixed to a gear 140a that is in constant mesh with gear 133 of a tubular lay shaft 134 which also has a gear 135 fixed at the opposite end. The tubular shaft 134 is journalled by conventional anti-friction bearing assemblies 136 on a shaft 137 fixed in the housing 102. Gear 135 meshes with a gear 138 on another shaft 139 and gear 138 also meshes with gear 140. Cam means such as cam element 141 are located on the shaft and between the clutch elements of the clutches C3 and C4 so that clutches C3 and C4 can be selectively engaged by the shifting means SM (FIG. 12). Cam means 141 is formed of helical shapes and is formed integral with the shaft as by broaching. More specifically, the cam elements 130 and 130a of clutches C3 and C4 are selectively engaged by the cam means 141 located between the cam elements of the clutches. In other words, the cam means 141 has helical cam elements 142 and 143 for actuating, respectively, the helical cam elements 130 and 130a of clutches C3 and C4. Thus, either cam surface 142 and 143 is positive to actuate its respective clutch and while the cam means 141 has been shown with cam elements 142 and 143 of similar configuration, such need not be the shape of the cam, but other shapes can be employed, the only requirement being one clutch or the other is actuated at a time.

Figure 13:
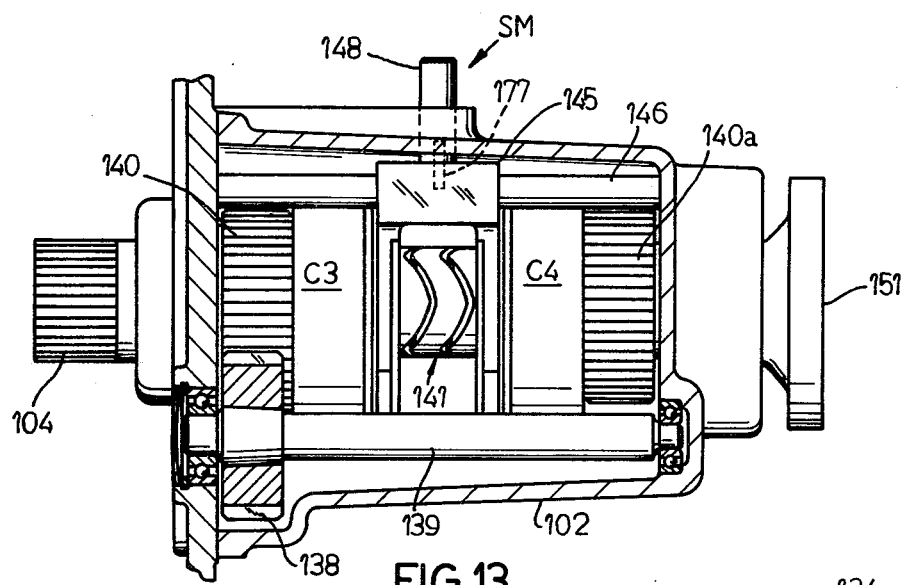
FIGS. 11 to 13 show a modified form of transmission in which the input and output members are arranged coaxially with respect to one another.

The clutch shifting means SM shown in FIGS. 12 and 13 includes a double pronged shifter fork 144 engaging the clutch drums 124, 124a, the fork being secured to a longitudinal shiftable block 145. Block 145 is slideably mounted on fixed shaft 146 and is shifted by a pin 177 engaged therewith and eccentrically fixed in the rotatable stub shaft 148.

Either clutch C3 or clutch C4 is engaged while the other is disengaged so as to drive the power transmission in opposite directions as selected.

Figure 11:
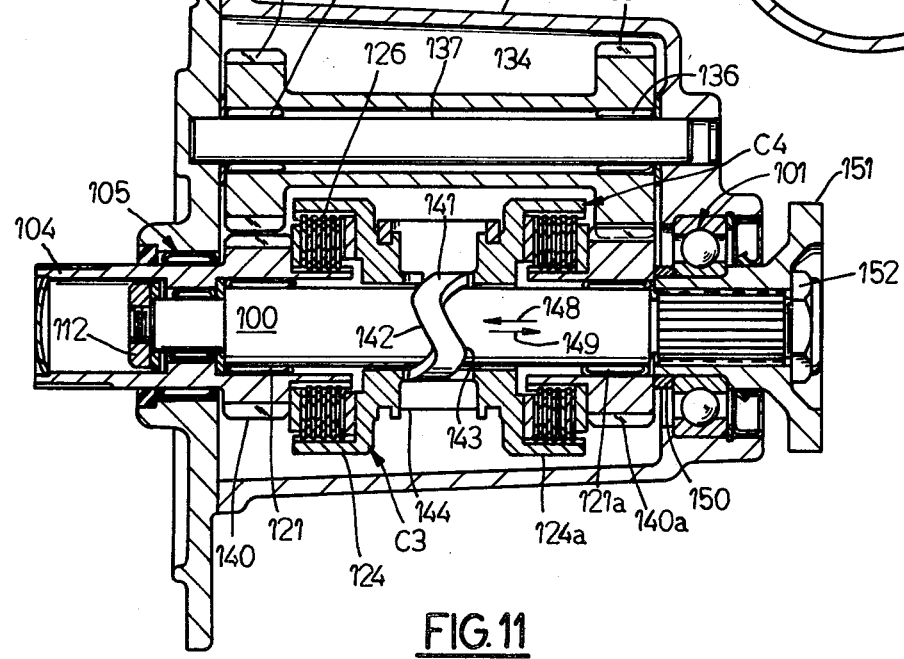
Figure 14:
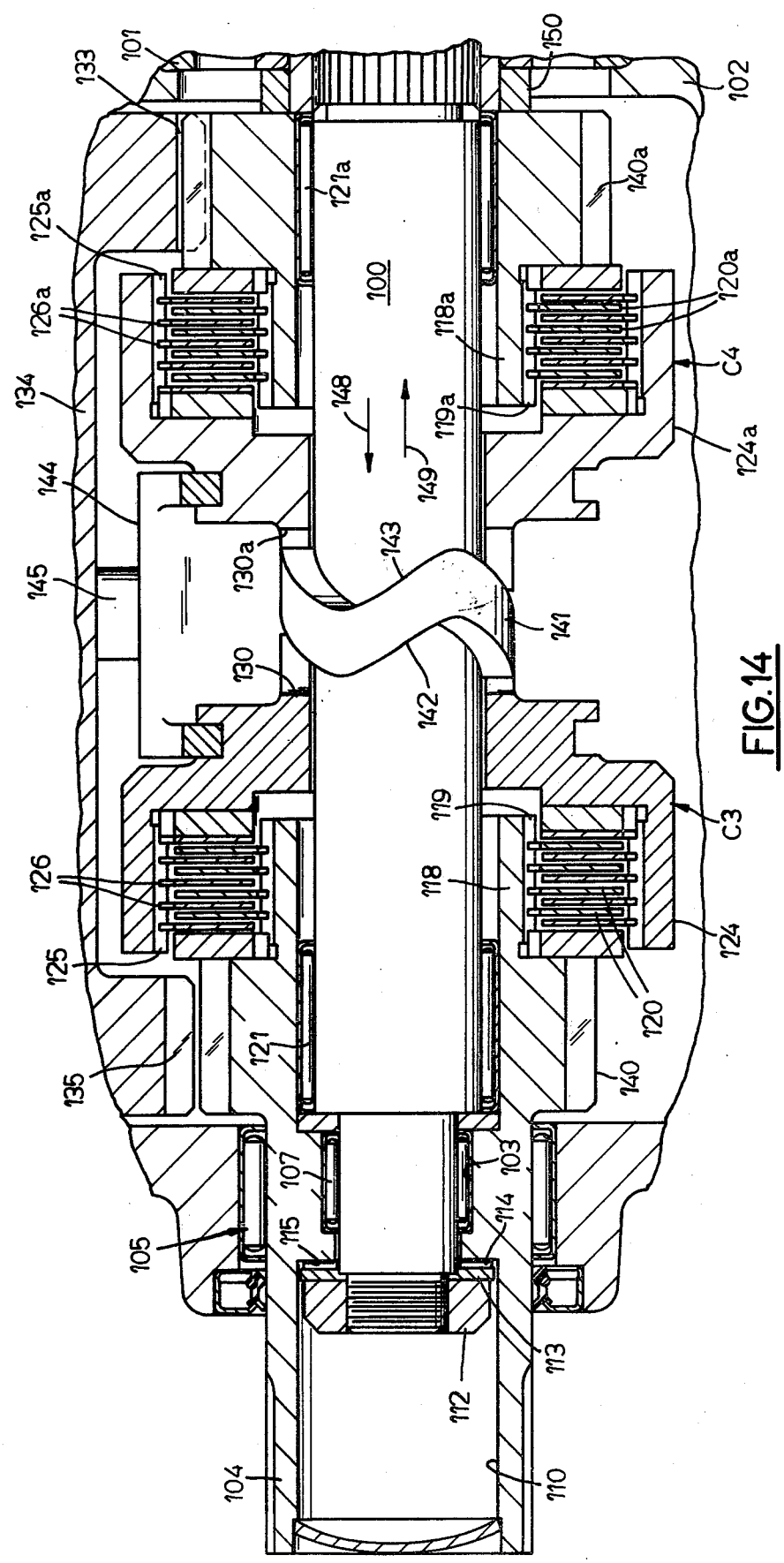
FIG. 14 is an enlarged, fragmentary view of a portion of the transmission shown in FIG. 11.

The axial thrust imposed on shaft 100 due to the action of the clutches must be absorbed in one direction or another and at that end of the shaft 100 which is open or accessible there is no particular problem. In other words, when the shaft thrust is in the direction indicated by the arrow 148, the axial thrust is absorbed by clutch elements 118a and its gear 140a, spacer 150 on shaft bearing 101 and the coupling member 151 fixed on the end of the shaft and splined thereto, all of which are axially secured in place on the shaft by a large threaded nut 152 threaded on the end of the shaft. However, the other end of the shaft 100, shown at the left end in FIG. 11, is not open or easily accessible and therefore, provision is made to be able to absorb the thrust of shaft 100 in the direction of arrow 149 when the left end of the shaft is located within the concentric tubular shaft 104. Thus, a special problem exists in the present arrangement where the shafts are arranged coaxially. Any fastening means on this end of shaft 100 must rotate with it. Thus, the axial thrust of shaft 100 in the direction as indicated by the arrow 149 is absorbed by a large nut 112 threadably engaged on the end of the shaft and the large thrust washer 113 located between the nut and the anti-friction bearing assembly 114 which abuts against the shoulder 115 formed by the counterbore 110 as previously mentioned. Thus, the axial thrust of the clutch drum member 124 acts to drive the shaft 100 to the right as viewed in FIG. 14; namely in the direction of the arrow 149, and this thrust is then absorbed through the nut 112, thrust washer 113, anti-friction bearing assembly 114, and the tubular shaft 104.

In either form of the invention, the helical cam means fixed to the shaft drives the helical cam elements located on the clutch element which constitutes a clutch clamp up element. The interengaging cam surfaces are never disconnected, but always rotate together although they are axially movable relative to one another and they act to cause clutch clamp up force and also act to transmit driving torque.

In either embodiment of the invention, the particular angles used for the helical cam surfaces depends on the number of clutch plates used in the clutch. For example, a low cam helix angle provides large axial thrust, and therefore a small number of plates is required. Increasing the cam helix angle will reduce the axial thrust, thus reducing clamping force and requiring more clutch plates. The latter situation reduces stress levels, softens clutch engagement, and provides for greater energy absorption in the clutch plate pack.

I claim:

1. In a power transmission of the interleaved, multiple friction plate type, a rotatable shaft, a helical cam element fixed with said shaft, a friction plate type clutch mounted around said shaft and having a clutch drum member having a helical cam element which is cooperative with said helical cam element of said shaft, a gear journalled on said shaft for rotation relative thereto, a splined second clutch member integral with said gear for rotation therewith, interleaved friction plates splined to and located between said clutch members, and shifting means for axially shifting said drum member and its cam element to engagingly clamp up and disengage said friction plates, whereby clutch clamp up force and driving torque are transmitted through and by said cam element, said clutch drum member having internal splines and said second clutch member being formed as an axially extending hub from said gear and has external splines, said interleaved friction plates being splined to said clutch drum splines and said second clutch member splines.

2. The transmission set forth in claim 1 further characterized in that said clutch drum member has an axially extending hub and said helical cam element is located on an axial end of said hub and faces in an axial direction.

3. The transmission set forth in claim 1 further characterized in that said clutch drum member is rotatable relative to said shaft when said clutch is disengaged, and said second clutch member is journalled for rotation on said shaft.

4. The transmission set forth in claim 3 further characterized in that said clutch drum member has an axially extending hub and said helical cam element is located on an axial end of said hub and faces in an axial direction.

5. A power transmission as set forth in claim 3 further characterized in that said clutch drum member has internal splines and said second clutch member is formed as an axially extending hub from said gear and has external splines, said interleaved friction plates being splined to said clutch drum splines and said second clutch member splines.

6. The transmission set forth in claim 5 further characterized in that said clutch drum member has an axially extending hub and said helical cam element is located on an axial end of said hub and faces in an axial direction.

7. In a power transmission of the interleaved, multiple friction plate type, a rotatable shaft, a helical cam element fixed with said shaft, a friction plate type clutch mounted around said shaft and having a clutch drum member having a helical cam element which is cooperative with said helical cam element of said shaft, a gear journalled on said shaft for rotation relative thereto, a splined second clutch member integral with said gear for rotation therewith, interleaved friction plates splined to and located between said clutch members, and shifting means for axially shifting said drum member and its cam element to engagingly clamp up and disengage said friction plates, whereby clutch clamp up force and driving torque are transmitted through and by said cam elements, said helical cam element fixed to said shaft having a gear fixed therewith for rotation with said shaft, whereby power can be taken from said shaft selectively through said gear journalled on said shaft or said gear fixed with said cam element on said shaft, depending on whether said clutch is engaged or disengaged, respectively.

8. A power transmission of the interleaved, multiple friction plate type, a housing, a rotatable first shaft mounted in said housing, helical cam means fixed with said shaft and for rotation therewith, a pair of friction plate type clutches mounted around said shaft and each comprising; a clutch drum member mounted on said shaft for limited axial movement relative to said shaft, said drum member having a helical cam element which is cooperative with said helical cam means of said shaft, a splined second clutch member journalled for rotation on said shaft and having a gear formed therewith, interleaved friction plates splined to and located between said members; and means for selectively and axially shifting said clutching drum members, whereby said cam elements selectively shift axially for driving contact with said cam means to engagingly clamp up and disengage said friction plates, and whereby clamp up force and drive torque are selectively transmitted through and by said cam elements and through and by said cam means, said clutch drum member having internal splines and said second clutch member being formed as an axially extending hub from said gear and has external splines, said interleaved friction plates being splined to said clutch drum splines and said second clutch member splines.

9. A power transmission of the interleaved, multiple friction plate type, a housing, a rotatable first shaft mounted in said housing, helical cam means fixed with said shaft and for rotation therewith, a pair of friction plate type clutches mounted around said shaft and each comprising; a clutching drum member mounted on said shaft for limited axial movement relative to said shaft, said drum member having a helical cam element which is cooperative with said helical cam means of said shaft, a splined second clutch member journalled for rotation on said shaft and having a gear formed therewith, interleaved friction plates splined to and located between said members; means for selectively and axially shifting said clutching drum members, whereby said cam elements selectively shift axially for driving contact with said cam means to engagingly clamp up and disengage said friction plates, and whereby clamp up force and drive torque are selectively transmitted through and by said cam elements and through and by said cam means, and a generally tubular shaft also mounted in said housing and arranged coaxially with said first shaft and extending from said housing, said generally tubular shaft being fixed with one of said gears formed with one of said second clutch members, said first shaft being rotatably journalled at one end within said generally tubular shaft, an axial thrust absorbing means connected between said one end of said first shaft and said generally tubular shaft for absorbing axial thrust of said first shaft in one direction when one of said clutches is engaged.

* * * * *